(12) United States Patent
Yamamoto et al.

(10) Patent No.: US 11,137,234 B2
(45) Date of Patent: Oct. 5, 2021

(54) GAS GENERATOR AND ASSEMBLY METHOD FOR DUAL-TYPE GAS GENERATOR

(71) Applicant: DAICEL CORPORATION, Osaka (JP)

(72) Inventors: Koji Yamamoto, Tatsuno (JP); Mikio Yabuta, Tatsuno (JP)

(73) Assignee: DAICEL CORPORATION, Osaka (JP)

( * ) Notice: Subject to any disclaimer, the term of this patent is extended or adjusted under 35 U.S.C. 154(b) by 0 days.

(21) Appl. No.: 16/617,760

(22) PCT Filed: Mar. 16, 2018

(86) PCT No.: PCT/JP2018/010504
§ 371 (c)(1),
(2) Date: Nov. 27, 2019

(87) PCT Pub. No.: WO2018/220950
PCT Pub. Date: Dec. 6, 2018

(65) Prior Publication Data
US 2020/0173759 A1    Jun. 4, 2020

(30) Foreign Application Priority Data

May 29, 2017 (JP) .............................. JP2017-105942

(51) Int. Cl.
*F42B 3/04* (2006.01)
(52) U.S. Cl.
CPC ..................................... *F42B 3/04* (2013.01)

(58) Field of Classification Search
CPC .................................. F42B 3/04; B60R 21/26
See application file for complete search history.

(56) References Cited

U.S. PATENT DOCUMENTS 6,276,717 B1    8/2001   Katsuda et al.
2004/0061319 A1*  4/2004   Saso ................... B60R 21/2644
                                                    280/741

(Continued)

FOREIGN PATENT DOCUMENTS

JP          51-39837 A    4/1976
JP          3009569 U     4/1995

(Continued)

*Primary Examiner* — J. Woodrow Eldred
(74) *Attorney, Agent, or Firm* — Birch, Stewart, Kolasch & Birch, LLP

(57) ABSTRACT

A gas generator including, an igniter, a housing made of metal and including a gas discharge port and a combustion chamber for burning a solid gas generating agent, the solid gas generating agent being filled at a position where the solid gas generating agent can be burned by actuation of the igniter, and the housing being configured to accommodate the igniter and an isolating member including an isolating wall interposed, inside the housing, between the gas generating agent disposed in the combustion chamber and a bottom surface and a side surface of the combustion chamber, the isolating wall being made from a predetermined resin material and being in contact with the gas generating agent to apply a predetermined holding force to the gas generating agent.

11 Claims, 7 Drawing Sheets

(56) References Cited

U.S. PATENT DOCUMENTS

2006/0267322 A1\* 11/2006 Eckelberg ............... B60R 21/26
  280/736
2008/0136152 A1\* 6/2008 McFarland ........... B60R 21/264
  280/736

FOREIGN PATENT DOCUMENTS

JP          11-59315 A    3/1999
WO    WO 02/051673 A1    7/2002

\* cited by examiner

GAS GENERATOR AND ASSEMBLY METHOD FOR DUAL-TYPE GAS GENERATOR

FIELD

The present invention relates to a gas generator configured to burn a gas generating agent by actuation of an igniter, thereby generating combustion gas.

BACKGROUND

In a gas generator configured to burn a gas generating agent, which is filled in a combustion chamber, by actuation of an igniter to generate combustion gas, unless the gas generating agent that is filled burns as desired, it is difficult to generate combustion gas as designed. A housing of a gas generator is typically made of metal to withstand a pressure generated by the burning of the gas generating agent. However, in a metallic housing filled with a gas generating agent, if the gas generating agent is moved undesirably in the housing, the gas generating agent may be pulverized due to contact between the housing and the gas generating agent. The pulverized gas generating agent may exhibit different combustion characteristics from those of a gas generating agent that is not pulverized, because the surface area of the pulverized gas generating agent is greater than the gas generating agent that is not pulverize, and as a result, the gas generating agent that burns as designed may not be obtained. Moreover, such undesirable movement of the gas generating agent may cause a noise when vibration occurs.

Thus, for example, in the technology disclosed in Patent Document 1, disk-shaped cushion members are disposed in a manner to contact, in the vertical direction of the housing, with the gas generating agent filled in the housing. In this way, the buffering function of the cushion member may be utilized to prevent the gas generating agent from moving in the housing.

CITATION LIST

Patent Document

[Patent Document 1] JP H11-59315 A

SUMMARY

Technical Problem

To implement output characteristics as designed when using a gas generator, pulverization of a gas generating agent filled in a combustion chamber in a housing of the gas generator has to be prevented, from manufacture till actuation of the gas generator, and the shape of the gas generating agent has to be maintained as much as possible. However, in the related art, the cushion materials are disposed merely on the upper side and the lower side in the inside of the combustion chamber, for preventing pulverization of the gas generating agent. In this case, the cushion material prevents, in the vertical direction of the combustion chamber, contact between the gas generating agent and objects other than the cushion member, but does not prevent contact between the gas generating agent and objects other than the cushion member in the lateral direction of the combustion chamber. Therefore, when the gas generator is vibrated, such contact may cause pulverization and vibration noise of the gas generating agent. Hence, the related art has room for improvement.

In light of the problems described above, an object of the present invention is to provide a technology for suppressing generation of pulverization of a gas generating agent filled in a housing of a gas generator, and vibration noise therefrom.

Solution to Problem

In order to solve the above problems, the present invention employs a configuration in which an isolating wall formed from resin is interposed between a side surface and a bottom surface of a combustion chamber of a gas generator and a gas generating agent filled in the combustion chamber. By employing the configuration, it is possible to apply a predetermined holding force to the gas generating agent, thereby suppressing undesired movement of the gas generating agent.

Specifically, a gas generator according to an embodiment of the present invention includes an igniter, a housing made of metal and including a gas discharge port and a combustion chamber for burning a solid gas generating agent, the solid gas generating agent being filled at a position where the solid gas generating agent is burned by actuation of the igniter, and the metal housing being configured to accommodate the igniter, and an isolating member including an isolating wall interposed, inside the housing, between the gas generating agent disposed in the combustion chamber and a bottom surface and a side surface of the combustion chamber, the isolating wall formed from a predetermined resin material and being in contact with the gas generating agent to apply a predetermined holding force to the gas generating agent.

In the gas generator according to the embodiment of the present invention, the igniter is accommodated within the housing, and the combustion chamber formed in the housing is filled with the gas generating agent. The gas generating agent is burned by the actuation of the igniter. In a case where the combustion chamber is defined by a part of the housing, for example, the inner wall surface of the housing, or defined by an object different from the housing disposed in the housing, the gas generating agent filled in the combustion chamber comes into direct contact with the object defining the combustion chamber. In a case where such a contact state occurs, when the gas generator is vibrated by an external source of vibration, the gas generating agent may be pulverized. In particular, when the combustion chamber is defined by the inner wall surface of the housing that is made from metal, pulverization of the gas generating agent tends to occur. Furthermore, such a contact state may also cause a noise due to vibration of the gas generating agent.

Thus, in the gas generator according to the embodiment of the present invention, the isolating wall of the isolating member is interposed between the bottom surface and the side surface of the combustion chamber and the gas generating agent filled in the combustion chamber, whereby direct contact between the gas generating agent and the object defining the combustion chamber is avoided and a predetermined holding force is applied, by the isolating wall, to the gas generating agent. Note that the isolating wall is a part of the isolating member and is interposed between the gas generating agent and the bottom and side surfaces of the combustion chamber, as described above. The isolating member may include the isolating wall only or may further include a structure other than the isolating wall. This predetermined holding force is applied by the isolating wall that is made from a resin to prevent movement of the gas generating agent in the combustion chamber thereby suppressing the pulverization of the gas generating agent.

Thus, the isolating wall of the isolating member may be configured to prevent the gas generating agent from contacting with the bottom surface and the side surface of the combustion chamber, and to apply the above-described predetermined holding force to the gas generating agent filled in the combustion chamber. For this, the isolating wall may be made from a material having a hardness lower than that of the housing. Furthermore, the isolating wall may be made from a material having a hardness lower than that of the gas generating agent. For example, the isolating wall may be made from resin. Furthermore, the isolating wall may be made from a material that is deformable when contacting with the gas generating agent that is filled, to effectively apply the predetermined holding force to the gas generating agent filled in the combustion chamber. The deformation may be elastic deformation or plastic deformation. Such deformation allows the contact between the isolating wall and the gas generating agent to be effectively maintained, and thus it is possible to suppress, by the buffering effect of the isolating wall, the pulverization and generation of vibration noise caused by undesired movement of the gas generating agent.

Further, in the gas generator described above, the isolating member may be formed to cover an entirety of the bottom surface and the side surface of the combustion chamber by the isolating wall. With the configuration, it is possible to more reliably prevent contact between the gas generating agent and the bottom and side surfaces of the combustion chamber. Note that, as described above, the suppression of the pulverization of the gas generating agent can be achieved by preventing contact between the gas generating agent and the bottom and side surfaces of the combustion chamber. Therefore, as long as such contact can be prevented, it is not necessary for the isolating wall to cover the entirety of the bottom surface and the side surface of the combustion chamber. Thus, the bottom surface and the side surface of the combustion chamber may partially be covered by the isolating wall.

Further, in the gas generator described above, the isolating member may be integrally formed from the predetermined resin material. When the isolating member is integrally formed, as described above, it is possible to reduce workload for assembly required for, e.g., placing the isolating member in the housing during assembly of the gas generator. Note that, in the gas generator according to an embodiment of the present invention, the isolating member may be formed of a plurality of members, as a matter of course.

Here, in the gas generator described above, the side surface of the combustion chamber may be partially defined by a predetermined inner wall surface of the housing, and, in this case, the isolating member may be disposed in the housing in a manner in which a gap is formed between the isolating wall and the predetermined inner wall surface of the housing. When the gap is formed between the side surface of the combustion chamber defined by the predetermined inner wall surface and the isolating wall, as described above, the isolating wall can be displaced or deformed toward the predetermined inner wall surface when the gas generating agent is filled in the combustion chamber. As a result, it is possible to sustainably and stably apply the predetermined holding force to the gas generating agent that is filled, and thus the pulverization of the gas generating agent can be avoided.

Further, in the gas generator described above, the isolating wall may include a plurality of protrusions made of resin and extending toward an inside of the combustion chamber when the isolating member is disposed within the housing, and the plurality of protrusions may be deformable so as to receive a force applied by the gas generating agent filled in the combustion chamber. In a case where the plurality of protrusions formed from a resin are provided on the isolating wall, as described above, enhanced contact with the gas generating agent filled in the combustion chamber can be achieved. As a result, it is possible to sustainably and stably apply the predetermined holding force to the gas generating agent that is filled, and thus the pulverization of the gas generating agent can be prevented. Note that the size of the protrusions is preferably sufficiently small relative to the size of the gas generating agent to prevent breakage, etc. of the gas generating agent that contacts with the protrusions.

Here, in the gas generator described above, in addition to the gas generating agent, a solid transfer charge may be filled in the combustion chamber, the isolating member may further include a transfer charge isolating wall for positioning the transfer charge around the igniter to allow the transfer charge to burn by actuation of the igniter, the transfer charge isolating wall defining a transfer charge filling chamber to prevent the transfer charge and the gas generating agent from being mixed with each other prior to the actuation of the igniter, and at least the transfer charge isolating wall may be made from a material that is deformable, breakable, combustible, or meltable when the transfer charge is burned. In the gas generator, combustion is initiated when the igniter is actuated, and then the transfer charge burns, whereby ultimately the gas generating agent in the housing burns. Here, the transfer charge may be another gas generating agent accommodated, in the housing, separately from the above-described gas generating agent, or may alternatively be gunpowder such as known black powder.

When the transfer charge is burned before the gas generating agent is ultimately burned as described above, the transfer charge and the gas generating agent have to be suitably separately disposed in the housing before the igniter is actuated. This is because when the transfer charge and the gas generating agent are mixed with each other, the gas generating agent cannot be burned as designed. Therefore, in the gas generator described above, the isolating member includes the transfer charge isolating wall, whereby it is possible to position the transfer charge around an ignition charge in a manner in which the transfer charge is not mixed with the gas generating agent. When the igniter is actuated, the transfer charge is burned whereby the transfer charge isolating wall is deformed, broken, burned, or melted. Thus, the combustion of the transfer charge may smoothly lead to combustion of the gas generating agent. As described above, by using the isolating member in the gas generator, it is possible to suitably achieve suppression of pulverization of the gas generating agent and prevention of mixing of the transfer charge and the gas generating agent in the housing.

Here, in the gas generator described above, the housing may include a first housing made of metal and including the gas discharge port formed therein and a second housing made of metal and disposed below the first housing, the housing may include, inside thereof, a divider wall dividing the combustion chamber into a first combustion chamber that is on an upper side and a second combustion chamber that is on a lower side, a first igniter and a second igniter different from the first igniter may be disposed at a bottom surface of the second housing, the first igniter may be configured to burn a first gas generating agent filled in the first combustion chamber, the second igniter may be configured to burn a second gas generating agent that is filled in the second combustion chamber and that is the gas generating agent, a first igniter accommodating portion may be formed by the divider wall, the first igniter accommodating portion extending into the second housing to surround the first igniter and accommodate the first igniter within the first combustion chamber, a side surface of the second combustion chamber may be defined by an inner wall surface of the second housing and a predetermined outer peripheral wall surface of the first igniter accommodating portion positioned in the second housing, and the isolating wall of the isolating member may be interposed, in the second housing, between a bottom surface and the side surfaces of the second combustion chamber and the second gas generating agent filled in the second combustion chamber.

The gas generator described above is a so-called dual-type gas generator having two igniters, and in the housing, the upper combustion chamber is formed above the lower chamber. Therefore, gas output of the gas generator can be increased without increasing the width of the gas generator. Here, since the first igniter and the second igniter are disposed on the second housing side, the divider wall, which divides the internal space of the housing into the first combustion chamber on the upper side and the second combustion chamber on the lower side, includes the first igniter accommodating portion that surrounds and accommodates the first igniter in a manner in which the first igniter disposed in the second housing is included in the first combustion chamber. Thus, the second combustion chamber on the lower side is substantially a part of the internal space of the second housing excluding the first igniter accommodating portion, and the side surfaces of the second combustion chamber are the inner wall surface of the second housing and a predetermined outer peripheral wall surface of the first igniter accommodating portion. Thus, in the dual-type gas generator described above, the isolating wall of the isolating member is formed to be adaptable to the second combustion chamber having such a shape.

Here, the invention of the present application can be considered from an aspect of an assembly method for a dual-type gas generator.

Specifically, the invention of the present application is an assembly method for a dual-type gas generator including a housing having a first housing made from metal and including a gas discharge port formed therein and a second housing made from metal and disposed below the first housing, the dual-type gas generator further includes, in the housing, a first igniter and a second igniter different from the first igniter, and the first igniter and the second igniter are configured to burn a first gas generating agent and a second gas generating agent, respectively. Furthermore, the housing includes, inside thereof, a divider wall dividing the combustion chamber into a first combustion chamber that is on an upper side and a second combustion chamber that is on a lower side, the first combustion chamber is filled with the first gas generating agent, and the second combustion chamber is filled with the second gas generating agent, a first igniter accommodating portion is formed by the divider wall, the first igniter accommodating portion extends into the second housing, to surround and accommodate the first igniter, and a side surface of the second combustion chamber is defined by an inner wall surface of the second housing and a predetermined outer peripheral wall surface of the first igniter accommodating portion positioned in the second housing. In this case, the assembly method includes; placing the first igniter and the second igniter at a bottom surface of the second housing; placing an isolating member into the second housing, the isolating member including an isolating wall made from a predetermined resin material, and the isolating wall forming a predetermined filling space that is to be filled with the second gas generating agent and is configured to prevent a bottom surface and the side surface of the second combustion chamber and the second gas generating agent from coming into contact with each other, and applies a predetermined holding force to the second gas generating agent filled in the predetermined filling space; filling the predetermined filling space of the isolating member with the second gas generating agent, and establishing a state in which the predetermined holding force is applied to the second gas generating agent that is filled; attaching the isolating member to the second housing to form the second combustion chamber below the isolating member, for allowing the first igniter accommodating portion to be inserted into a predetermined space formed by an annular first igniter surrounding wall that is included in the isolating wall of the isolating member disposed in the second housing and corresponds to a predetermined outer peripheral wall surface of the first igniter accommodating portion, and placing the first gas generating agent above the isolating member attached to the second housing and at a position where the first gas generating agent is burned by actuation of the first igniter, and implementing sealing with use of the first housing, thereby forming the first combustion chamber.

The above-described gas generator is a dual-type gas generator in which the two combustion chambers, i.e., the upper and lower combustion chambers, are disposed in the housing. In assembling of such a gas generator, components constituting the gas generator must be stacked in order. In particular, the gas generator has a configuration in which the internal space of the housing is divided by the divider wall into two combustion chambers, which are positioned on the upper side and the lower side, respectively, and thus, in the assembling of the gas generator, the divider wall has to be placed on the second housing, and then the first housing has to be placed on theses members. Here, as described above, by configuring a predetermined filling space in the isolating member to hold the second gas generating agent, the isolating member can function as a retainer for the second gas generating agent and thus it is possible to prevent the position of the gas generating agent from being shifted. In other words, in the assembly method described above, in a state where the second gas generating agent has been filled in the predetermined filling space in the isolating member, the first igniter accommodating portion of the divider wall is inserted into the predetermined space formed by the first igniter surrounding wall of the isolating member and the divider wall is attached to the second housing, and thus it is possible to prevent crushing and pulverization of the second gas generating agent, which has already been placed prior to the attaching the divider wall, occurring due to inadvertent contact with the first igniter accommodating portion of the divider wall. Accordingly, the first igniter surrounding wall maintains a space to which the first igniter accommodating portion is inserted. Furthermore, in the gas generator that has been assembled, the isolating member is interposed between the bottom surface and the side surface of the second combustion chamber and the second gas generating agent, and thus it is possible to suppress direct contact between the second gas generating agent and the second combustion chamber as well as undesired movement of the second gas generating agent, and as a result, the pulverization of the gas generating agent can be suppressed.

Advantageous Effects of Invention

With the present invention, it is possible to suppress generation of pulverization of a gas generating agent filled in a housing of a gas generator, and a vibration noise therefrom.

DESCRIPTION OF EMBODIMENTS

A gas generator according to an embodiment of the present invention and an assembly method thereof will be described below with reference to the drawings. Note that configurations of the following embodiment are provided as examples, and the present invention is not limited to the configurations of the embodiment.

Example 1

Figure 1:
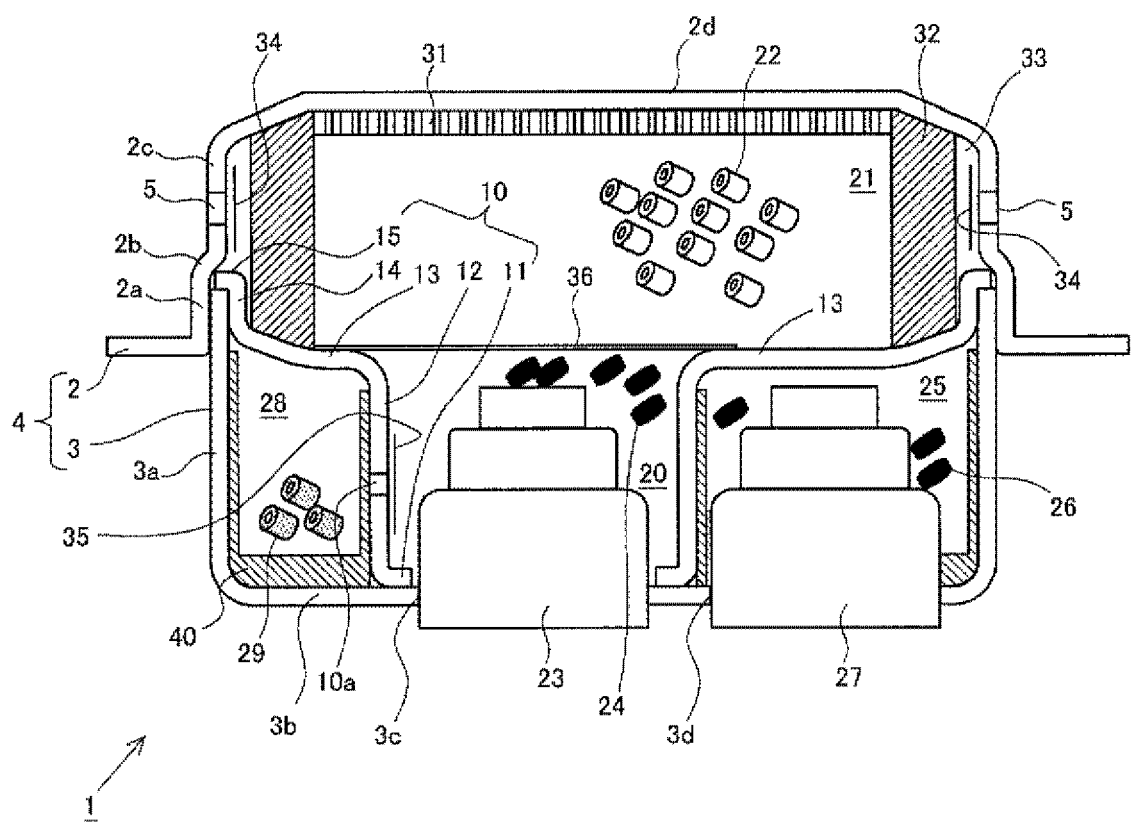
FIG. 1 is a first schematic representation of a configuration of a gas generator according to an embodiment of the present invention.
Figure 2:
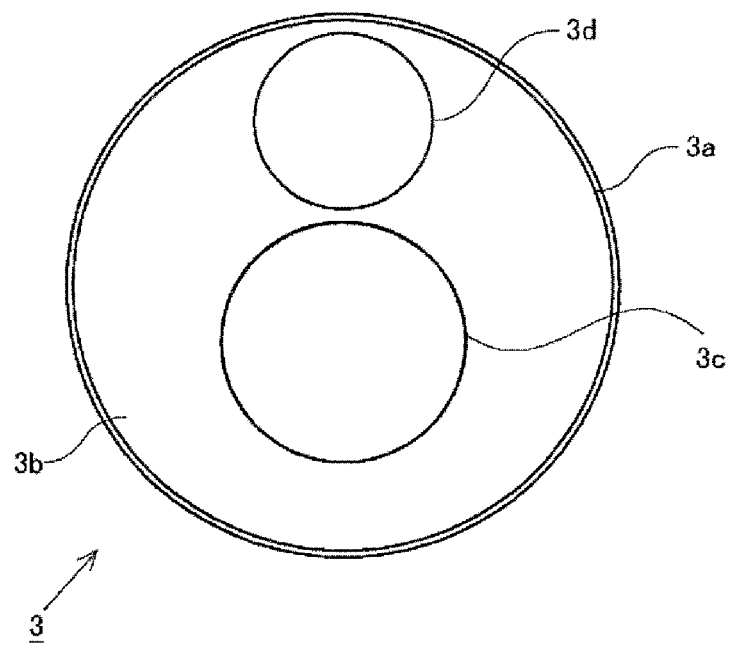
FIG. 2 is a top view of a lower shell that is to be incorporated into the gas generator illustrated in FIG. 1.

FIG. 1 is a cross-sectional view of a gas generator 1 in a height direction thereof, and FIG. 2 is a top view of a lower shell 3 (a second housing) included in the gas generator 1. The gas generator 1 is configured to burn a gas generating agent filled in a housing 4, which is formed of an upper shell 2 (a first housing) and the lower shell 3, and to discharge combustion gas. Note that the gas generator 1 is a so-called dual-type gas generator including two combustion chambers disposed on the upper side and lower side, respectively, and each of the two combustion chambers includes an igniter and a gas generating agent that correspond each of the combustion chambers, as described below. Here, the upper shell 2 includes a peripheral wall 2c and a top surface 2d which form a recessed internal space. The top surface 2d and a bottom surface 3b of the lower shell 3 described below are substantially circular when viewed from above. The peripheral wall 2c and a peripheral wall 3a of the lower shell 3 described below surround the top surface 2d and the bottom surface 3b, respectively, and extend substantially perpendicularly from the corresponding surfaces to form annular wall surfaces. The internal space of the upper shell 2 is a first combustion chamber 21 filled with a first transfer charge 24 and a first gas generating agent 22, as described below. The top surface 2d is connected to one end of the peripheral wall 2c, and the other end of the peripheral wall 2c serves as an opening of the upper shell 2. Further, on the other end side of the peripheral wall 2c, a mating wall 2a and an abutting portion 2b are provided in this order from the opening. The radius of the internal space formed by the mating wall 2a is larger than the radius of the internal space formed by the peripheral wall 2c on a side nearer to the top surface 2d, and the mating wall 2a connects to the peripheral wall 2c, with the abutting portion 2b interposed therebetween.

Furthermore, the lower shell 3 includes the peripheral wall 3a and the bottom surface 3b which form a recessed internal space. The internal space is a second combustion chamber 28 filled with a second transfer charge 26 and a second gas generating agent 29, as described below. The bottom surface 3b is connected to one end of the peripheral wall 3a, and the other end of the peripheral wall 3a serves as an opening of the lower shell 3 is positioned. The radius of the internal space formed by the peripheral wall 3a is substantially the same as the radius of the internal space formed by the peripheral wall 2c of the upper shell 2. As illustrated in FIG. 2, the bottom surface 3b of the lower shell 3 is provided with a fitting hole 3c and a fitting hole 3d in which a first igniter 23 and a second igniter 27 are fixed, respectively, as described below.

Further, in the housing 4, a divider wall 10 is disposed between the upper shell 2 and the lower shell 3. The divider wall 10 includes a terminating end 15, a mating wall 14, a dividing wall 13, a peripheral wall 12, and an attachment edge 11. The mating wall 14 extends from the terminating end 15 along the peripheral wall 3a of the lower shell 3. The dividing wall 13 is connected to the mating wall 14 and substantially divides the internal space of the housing 4 into an upper space and a lower space. The peripheral wall 12 is connected to the dividing wall 13 and extends to the bottom surface 3b of the lower shell 3. The attachment edge 11 is connected to the peripheral wall 12 and extends toward the first igniter 23. When the divider wall 10 is attached to the housing 4, with the terminating end 15 being placed on a terminating end surface of the peripheral wall 3a of the lower shell 3, as illustrated in FIG. 1, the dividing wall 13 forms a wall surface that is substantially parallel to the top surface 2d of the upper shell 2 and the bottom surface 3b of the lower shell 3, and the peripheral wall 12 is connected to the dividing wall 13 in a manner to form a space recessed from the wall surface of the dividing wall 13 toward the lower shell 3 (an accommodation space 20 described below). In addition, a through hole 10a, which is a through hole, is provided in the peripheral wall 12, and the through hole 10a allows communication between two spaces (the first combustion chamber 21 and the second combustion chamber 28, which will be described later) resulting from division by the divider wall 10. Note that the recessed space 20 is open toward a space positioned above the space 20 and the first igniter 23 is accommodated in the space 20, as described below, and thus the recessed space 20 is simply referred to as the "accommodation space 20". Note that the through hole 10a is closed by a closing member 35 from the accommodation space 20 side. When such a configuration is employed, there is a variation in a burst pressure of the closing member 35, and thus the closing member 35 is ruptured only when the second igniter 27 is actuated in the second combustion chamber 28, as described later. The attachment edge 11 forms a through hole through which the first igniter 23 fixed in the fitting hole 3c of the lower shell 3 is inserted. Note that in a state where the divider wall 10 is attached to the lower shell 3, the attachment edge 11 is in contact with a bottom surface near the fitting hole 3c of the bottom surface 3b, and the mating wall 14 of the divider wall 10 is mated with the peripheral wall 3a of the lower shell 3.

In a state where the divider wall 10 is attached on the lower shell 3 in the above-described manner, the upper shell 2 is further attached from above. As described above, since the radius of the internal space formed by the mating wall 2a of the upper shell 2 is larger than the radius of the internal space formed by the peripheral wall 2c, the upper shell 2 is mated with the lower shell 3, and thus, the abutting portion 2b is abutted on the terminating end 15 of the divider wall 10. In the state where the abutting portion 2b of the upper shell 2 abuts on the terminating end 15, the mating wall 14 is mated with the peripheral wall 3a of the lower shell 3. Note that, in the housing 4, at a site of mating or contact between the upper shell 2 and the lower shell 3, the upper shell 2 and the lower shell 3 are joined by any joining method (for example, welding) suitable in terms of moisture prevention, etc. for the gas generating agent filled in the housing 4.

As described above, the internal space of the housing 4 is substantially divided, by the divider wall 10, into two spaces positioned on the upper side and the lower side, respectively. In the internal space of the housing 4, the first igniter 23, in the first combustion chamber 21 defined by the upper shell 2 and the divider wall 10, there are the first transfer charge 24, and the first gas generating agent 22, and in the second combustion chamber 28 defined by the lower shell 3 and the divider wall 10, there are the second igniter 27, the second transfer charge 26, and the second gas generating agent 29. In this way, the gas generator 1 is configured as a dual-type gas generator including two igniters, i.e., the first igniter 23 and the second igniter 27. Note that the first igniter 23 and the second igniter 27 are both fixed on the bottom surface 3b of the lower shell 3, and thus the first igniter 23 is housed in the accommodation space 20 in a state in which the side of the first igniter 23 is surrounded by the peripheral wall 12 of the divider wall 10 and the top of the first igniter 23 does not protrude from the dividing wall 13 connecting to the peripheral wall 12.

Here, in the accommodation space 20, which is a portion of the first combustion chamber 21, the first igniter 23 is accommodated and the first transfer charge 24 is filled. As the first transfer charge 24, it is possible to use a gas generating agent that exhibits high ignitability and has a combustion temperature higher than that of the first gas generating agent 22. The combustion temperature of the first transfer charge 24 may be in a range from 1700 to 3000° C. An example of the first transfer charge 24 is a disk-shaped transfer charge including, for example, nitroguanidine (34 wt %) and strontium nitrate (56 wt %). In the first combustion chamber 21, the opening of the accommodation space 20 is closed by an aluminum tape 36 to prevent mixing with the first gas generating agent 22 filled in the space above the accommodation space 20 (a space substantially above the dividing wall 13).

In the first combustion chamber 21, the space above the aluminum tape 36 that closes the opening of the accommodation space 20 is filled with the first gas generating agent 22, and an annular filter 32 is disposed to surround the first gas generating agent 22. Here, the first gas generating agent 22 is filled in a state of being pressed, by biasing force applied by a cushion 31, against the filter 32, the dividing wall 13, etc. and thus, undesired vibration of the first gas generating agent 22 in the first combustion chamber 21 does not occur. As the first gas generating agent 22, a gas generating agent having a combustion temperature lower than that of the first transfer charge 24 is used. It is preferable that the first gas generating agent 22 has a combustion temperature in the range of 1000 to 1700° C. As the first gas generating agent 22, a single hole cylindrical gas generating agent including guanidine nitrate (41 wt %), basic copper nitrate (49 wt %), and a binder and an additive, for example, may be used.

The filter 32 is configured by stacking flat woven meshes made of stainless steel in the radial direction and compressing the meshes in the radial and axial directions. The filter 32 is configured to cool the combustion gas from the first gas generating agent 22 and collect combustion residue included in the combustion gas. Alternatively, a filter having a wire-wound type structure, in which a wire is wound forming multiple layers on a core rod, may be used as the filter 32. Note that the filter 32 also collects the combustion residue of the second gas generating agent 29 filled in the second combustion chamber 28. In addition, a gap 33 formed between the peripheral wall 2c of the upper shell 2 and the filter 32 forms a gas passage that surrounds the filter 32 and has an annular shape in the radial direction in cross sectional view. The gap 33 allows the combustion gas to pass through the entire area of the filter 32, and thus it is possible to achieve effective utilization of the filter 32 and effective cooling and filtration of the combustion gas. The combustion gas flowing through the gap 33 reaches a gas discharge port 5 provided in the peripheral wall 2c. In addition, to prevent moisture from entering the housing 4 from outside, the gas discharge port 5 is closed, by an aluminum tape 34, from the inside of the housing 4 until the gas generator 1 is actuated.

Next, the second combustion chamber 28 is filled with the second transfer charge 26 and the second gas generating agent 29 correspondingly to the second igniter 27 fixed in the fitting hole 3d of the lower shell 3. The second combustion chamber 28 is a space laterally defined by the inner wall surface of the peripheral wall 3a of the lower shell 3 and the outer peripheral surface of the peripheral wall 12 of the divider wall 10, and further defined, on the bottom side, by the bottom surface 3b of the lower shell 3, and, on the top side, by the dividing wall 13 of the divider wall 10. An example of the second transfer charge 26 is a pellet-shaped or cylindrical transfer charge including, for example, nitroguanidine (34 wt %) and strontium nitrate (56 wt %), similarly to the first transfer charge 24. In addition, similarly to the first gas generating agent 22, as the second gas generating agent 29, for example, a single hole cylindrical gas generating agent including guanidine nitrate (41 wt %), basic copper nitrate (49 wt %), and a binder and an additive, may be used.

Here, for the filling of the second transfer charge 26 and the second gas generating agent 29 (hereinafter, also sometimes referred to as "second gas generating agent 29, etc.") in the second combustion chamber 28, an isolating member 40 formed from resin is disposed in the lower shell 3 to suppress the second gas generating agent 29, etc. from being pulverized due to contact thereof with the metal lower shell 3 or the outer peripheral surface (an opposite wall surface to the wall surface defining the accommodation space 20) of the peripheral wall 12 of the divider wall 10 extending into the lower shell 3.

Figure 3:
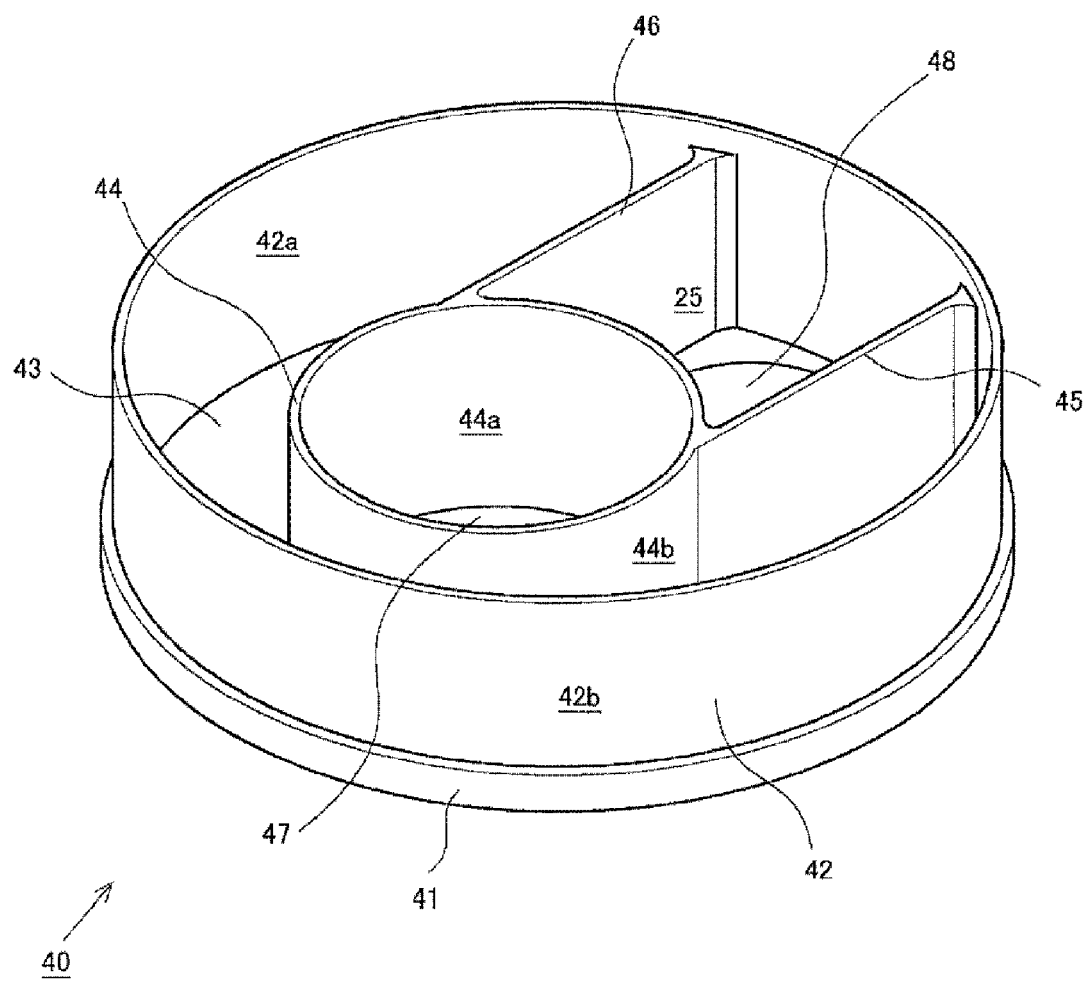
FIG. 3 is a schematic representation of a configuration of an isolating member that is to be incorporated into the gas generator illustrated in FIG. 1.
Figure 4:
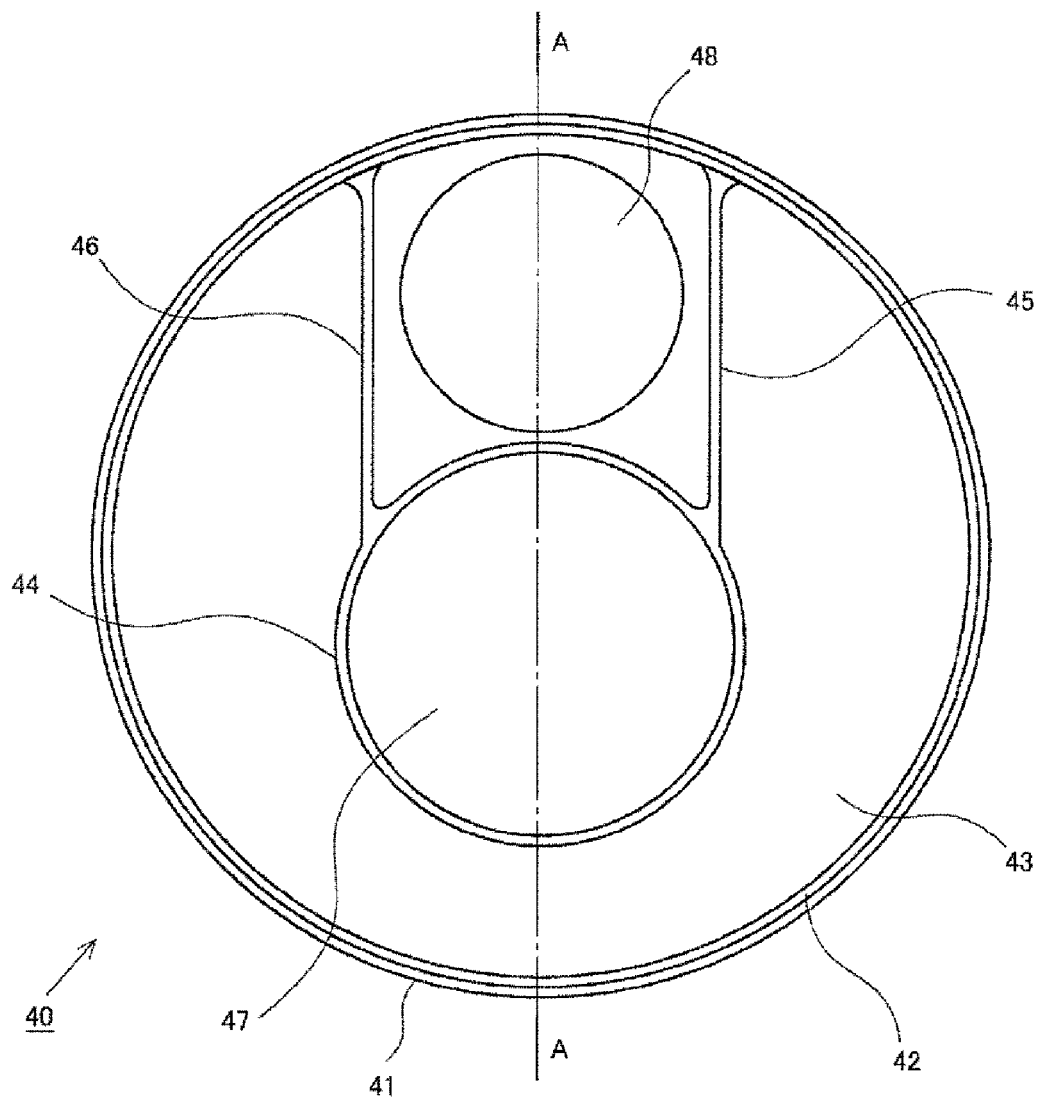
FIG. 4 is a top view of the isolating member illustrated in FIG. 3.
Figure 5A:
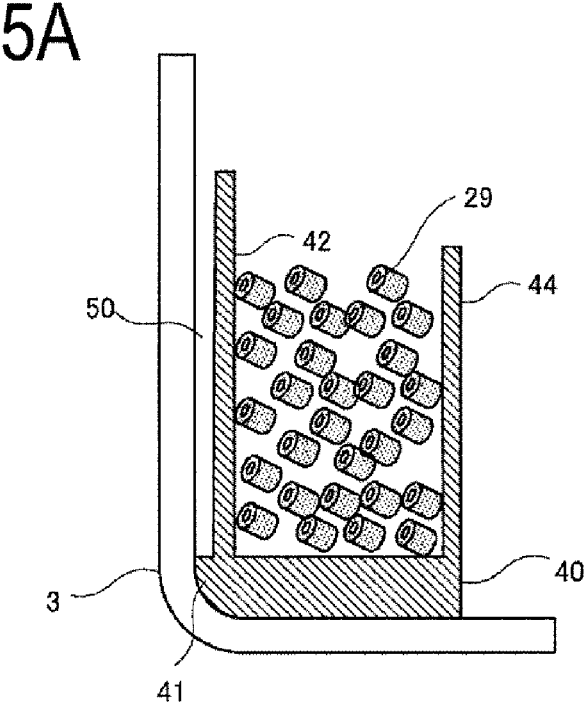
FIG. 5A is a partial enlarged view of a site where the isolating member illustrated in FIG. 3 is close to the housing of the gas generator.

Based on FIGS. 3 and 4, the isolating member 40 is described. FIG. 3 is a perspective view of the isolating member 40 and FIG. 4 is a top view of the isolating member 40. Note that the cross-section along the line A-A in FIG. 4 corresponds to the isolating member 40 illustrated in FIG. 1. The entirety of the isolating member 40 is formed from a single resin material, which is a material meltable by combustion heat of the second transfer charge 26 and the second gas generating agent 29 filled in the second combustion chamber 28. Specifically, the isolating member 40 includes an annular outer peripheral wall 42, an annular inner peripheral wall 44, and a bottom wall 43 connecting perpendicularly to the outer peripheral wall 42 and the inner peripheral wall 44 and forming the bottom wall surface of the isolating member 40. In a state where the isolating member 40 is disposed in the lower shell 3, an outer wall surface 42b of the outer peripheral wall 42 faces the inner wall surface of the peripheral wall 3a of the lower shell 3, an inner wall surface 44a of the inner peripheral wall 44 is in contact with the outer wall surface of the peripheral wall 12 of the divider wall 10, and the bottom wall 43 is in contact with the bottom surface 3b of the lower shell 3. Furthermore, a lower edge 41 protruding slightly outward is formed on the lower region of the outer peripheral wall 42. Therefore, a gap 50 is formed, depending on an amount of protrusion of the lower edge 41, between the outer wall surface 42b of the outer peripheral wall 42 and the inner wall surface of the peripheral wall 3a of the lower shell 3, as illustrated in FIG. 5A described later.

Furthermore, the inner peripheral wall 44 is disposed to face the outer wall surface of the peripheral wall 12 of the divider wall 10, and thus corresponds to a first igniter surrounding wall of the invention of the present application. Then, a predetermined space 47 surrounded by the inner peripheral wall 44 opens upward and downward, and the lower opening is formed to be aligned with the fitting hole 3c provided in the lower shell 3 in a state where the isolating member 40 is disposed in the lower shell 3. As a result, the first igniter 23 disposed in the lower shell 3 may be in a state of being inserted through the isolating member 40 when accommodated in the accommodation space 20 of the divider wall 10, as illustrated in FIG. 1.

A space in the isolating member 40 between the inner wall surface 42a of the outer peripheral wall 42 and the outer wall surface 44b of the inner peripheral wall 44 is a space in which the second transfer charge 26 and the second gas generating agent 29 are filled, and hereinafter, may be referred to as a predetermined filling space. Furthermore, the isolating member 40 is provided with a pair of partition walls 45 and 46 provided perpendicularly to the bottom wall 43. The pair of partition walls 45 and 46 connects the inner peripheral wall 44 and the outer peripheral wall 42, thereby defining a transfer charge filling chamber 25. The transfer charge filling chamber 25 is filled with the second transfer charge 26 and isolates the second transfer charge 26 from the second gas generating agent 29 to achieve a state, in which the second transfer charge 26 is not mixed with the second gas generating agent 29, in the predetermined filling space. The partition walls 45 and 46 correspond to a transfer charge isolating wall of the invention of the present application. Note that a part of the predetermined filling space other than the transfer charge filling chamber 25 is filled with the second gas generating agent 29. The ratio between the volume of the transfer charge filling chamber 25 and the volume of the space filled with the second gas generating agent 29, in the predetermined filling space may be appropriately set according to the output characteristics to be generated by the gas generator 1. A through hole 48 is provided on the bottom side of the transfer charge filling chamber 25 in a manner to be aligned with the fitting hole 3d provided in the lower shell 3. As a result, the second igniter 27 disposed at the lower shell 3 may be in a state of being inserted through the isolating member 40, as illustrated in FIG. 1.

The isolating member 40 configured as described above has a shape and dimensions which make it possible to cover the inner wall surface of the peripheral wall 3a of the lower shell 3 and the outer peripheral surface of the peripheral wall 12 of the divider wall 10, which are the side surfaces of the second combustion chamber 28, and cover the bottom surface 3b of the lower shell 3, which is the bottom surface of the second combustion chamber 28, in a state where the isolating member 40 is disposed in the lower shell 3 and incorporated into the housing 4, as illustrated in FIG. 1. Note that, in this state, the inner wall surface 44a of the inner peripheral wall 44 closes the through hole 10a provided in the peripheral wall 12 of the divider wall 10. However, as described above, since the isolating member 40 is formed from a resin material, which is meltable by combustion heat of the second gas generating agent 29, etc., the flow of the combustion gas from the second gas generating agent 29, etc. is not hindered. Alternatively, a through hole may be provided at the site of the inner peripheral wall 44 facing the through hole 10a to prevent the inner peripheral wall 44 from closing the through hole 10a. Furthermore, with the pair of partition walls 45 and 46 of the isolating member 40, the second transfer charge 26 and the second gas generating agent 29 can be separately filled, without being mixed with each other, in the second combustion chamber 28.

By disposing the isolating member 40 in the lower shell 3 as described above, the second transfer charge 26 and the second gas generating agent 29 filled in the second combustion chamber 28 are prevented from coming into direct contact with the side surfaces and the bottom surface of the second combustion chamber 28. Further, the isolating member 40 is formed from a resin material, the hardness of which is lower than the hardness of the metallic lower shell 3. Additionally, the hardness of the isolating member 40 is lower than the hardness of the second transfer charge 26 and the second gas generating agent 29, and thus it is possible to apply, by the buffering effect, a suitable holding force to the second gas generating agent 29, etc. filled in the predetermined filling space in the isolating member 40. The holding force applied to the second gas generating agent 29, etc. is a force that can suppress undesired movement of the second gas generating agent 29, etc.

As illustrated in FIG. 5A, the lower edge 41 is provided on the lower part of the isolating member 40, whereby the gap 50 is formed between the outer wall surface 42b of the outer peripheral wall 42 and the lower shell 3. The gap 50 allows the outer peripheral wall 42 to be deformed and displaced toward the lower shell 3 when the second gas generating agent 29, etc. is filled in the predetermined filling space of the isolating member 40. Thus, when the second gas generating agent 29, etc. is filled, the holding force required for the second gas generating agent 29, etc. is easily generated. Alternatively, as long as the holding force can be generated when the second gas generating agent, etc. are filled, the gap 50 is not always required, and thus the lower edge 41 in the isolating member 40 is not always required.

Figure 5B:
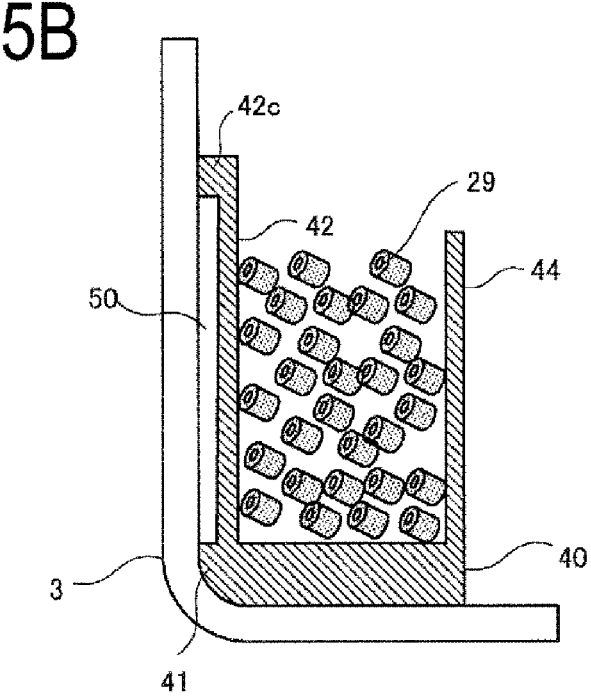
FIG. 5B is a partial enlarged view of a site where the isolating member illustrated in FIG. 3 is close to the housing of the gas generator.

Alternatively, as illustrated in FIG. 5B, the outer peripheral wall 42 of the isolating member 40 may further include, in addition to the lower edge 41, an upper edge 42c protruding outward by a length of extension similar to that of the lower edge 41, on the upper part thereof. Also in this case, the gap 50 is formed between the outer wall surface 42b and the lower shell 3. Thus, it is possible to cause a large amount of displacement near the middle part of the outer peripheral wall 42, and the above-described holding force can be suitably generated. In addition, since the contact points with respect to the lower shell 3 are provided in a decentralized manner, i.e., on the upper side and the lower side of the outer peripheral wall 42, respectively, it is possible to prevent excessive deformation, etc. of the outer peripheral wall 42 when filling with the second gas generating agent 29, etc. is implemented.

With the isolating member 40 being interposed between the second gas generating agent 29, etc. and the side and bottom surfaces of the second combustion chamber 28, pulverization of the second gas generating agent 29, etc. and generation of vibration noise relating to the second gas generating agent 29, etc., can be suitably suppressed in the second combustion chamber 28. In the gas generator 1 including the isolating member 40, when the first igniter 23 is firstly actuated, the first transfer charge 24 is ignited, and then the first gas generating agent 22 burns. In the first combustion chamber 21, the aluminum tape 36 prevents the first transfer charge 24 and the first gas generating agent 22 from being mixed with each other. The combustion gas from the first gas generating agent 22 passes through the filter 32, and then is discharged through the gas discharge port 5 to the outside. Following the actuation of the first igniter 23, the second igniter 27 is actuated to ignite the second transfer charge 26, and then the second gas generating agent 29 burns. In the second combustion chamber 28, the isolating member 40 prevents the second transfer charge 26 and the second gas generator 29 from being mixed with each other and suppresses the second gas generating agent 29, etc., from being pulverized and thus, the combustion gas can be generated by the second gas generating agent 29 as designed. The combustion gas passes through the through hole 10a and the first combustion chamber 21, and then is discharged through the gas discharge port 5 to the outside.

Assembly Method

Figure 6:
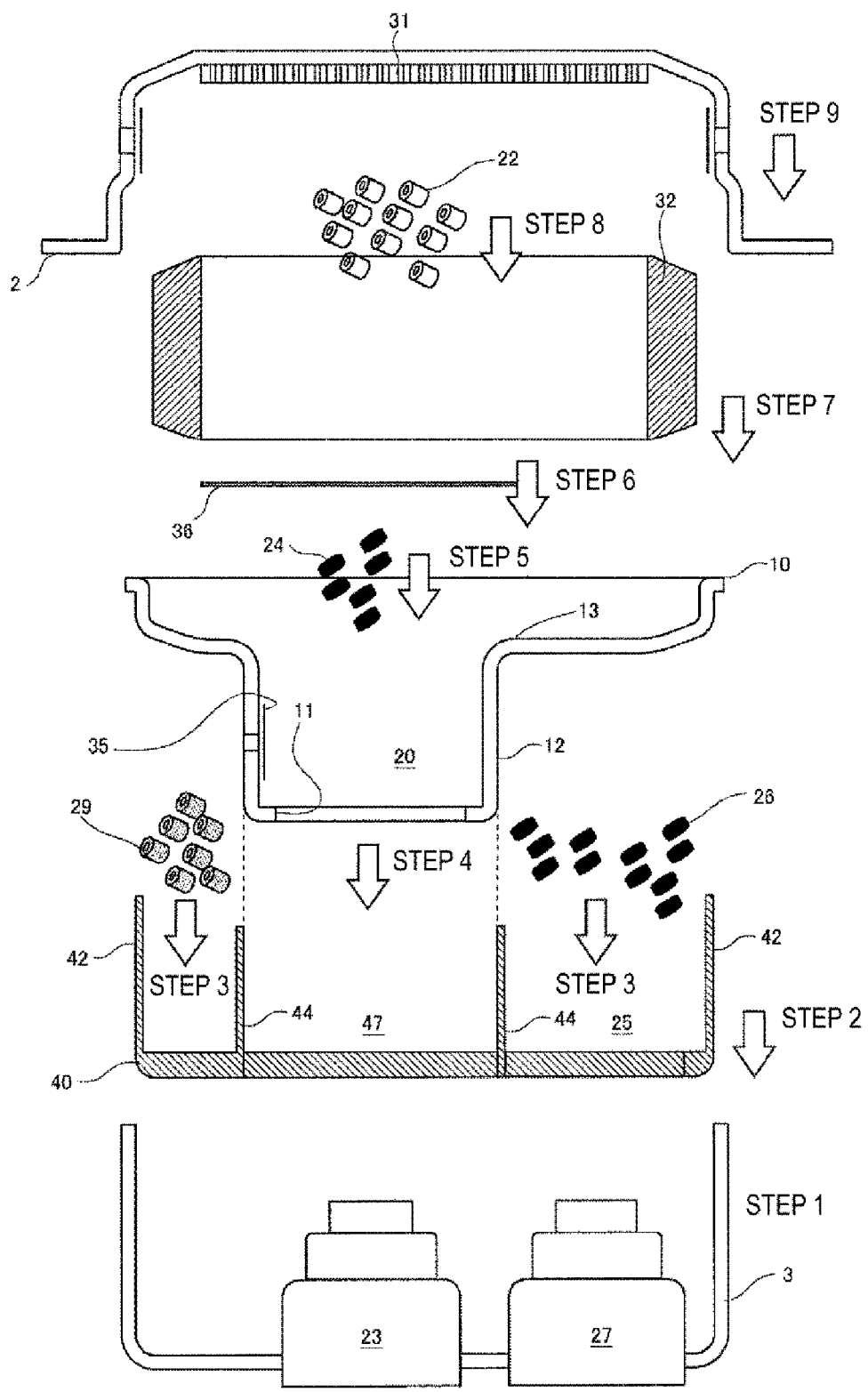
FIG. 6 illustrates a procedure for assembling the gas generator illustrated in FIG. 1.

An assembly method for the gas generator 1 will now be described based on FIG. 6. In the assembly method, the isolating member 40 also functions as a retainer for ensuring holding positions for the second transfer charge 26 and the second gas generating agent 29 to allow the second transfer charge 26 and the second gas generating agent 29 to be positioned suitably in the second combustion chamber 28. The gas generator 1 is assembled in accordance with steps 1 to 9. Details of each step will be described below. First, in step 1, the first igniter 23 and the second igniter 27 are attached to the fitting holes 3c and 3d of the lower shell 3, respectively, to place these igniters at the bottom surface of the lower shell 3. Next, in step 2, the isolating member 40 is placed in the lower shell 3. In this step, the first igniter 23 is inserted into the predetermined space 47 of the isolating member 40 through the opening of the predetermined space 47, and the second igniter 27 is inserted into the transfer charge filling chamber 25 through the through hole 48.

Next, in step 3, the second transfer charge 26 is filled into the transfer charge filling chamber 25, and the second gas generating agent 29 is filled into the rest of the predetermined filling space of the isolating member 40. As a result of this filling, the second gas generating agent 29, etc. is in a state of receiving the above-described holding force applied by the resin isolating member 40, and this state is maintained by the outer peripheral wall 42 and the inner peripheral wall 44 of the isolating member 40. Therefore, when the divider wall 10 is attached to the lower shell 3 in the next step 4, inadvertent contact between the divider wall 10 and the second gas generating agent 29, etc. can be suitably avoided. Then, in step 4, the divider wall 10 is attached to the lower shell 3, and thus, the peripheral wall 12 of the divider wall 10 is inserted into the predetermined space 47 of the isolating member 40 disposed in the lower shell 3. As a result, the second combustion chamber 28 is formed by the divider wall 10 and the lower shell 3, and the second gas generating agent 29, etc., in a state of being filled in the isolating member 40 is accommodated in the second combustion chamber 28.

Next, in step 5, the first transfer charge 24 is filled into a space, i.e., the accommodation space 20, surrounded by the peripheral wall 12 of the divider wall 10 inserted into the predetermined space 47, and thereafter, in step 6, the accommodation space 20 is closed by the aluminum tape 36. Further, in step 7, the filter 32 is placed on the dividing wall 13 of the divider wall 10, and in step 8, the first gas generating agent 22 is filled at the center of the filter 32. In step 9, the upper shell 2 is attached to the lower shell 3 along with the cushion 31. As a result, the first combustion chamber 21 is formed by the upper shell 2 and the divider wall 10, and the assembly of the gas generator 1 is completed.

In the gas generator 1, which is of a dual-type, attachment of the divider wall 10 is required to form the combustion chambers on the upper side and the lower side, respectively. The divider wall 10 can be easily attached to the lower shell 3, and breaking of the second gas generating agent 29, etc., during assembly can be avoided. This is because the isolating member 40 has the function of holding the second gas generating agent 29, etc., that are to be burned in the second combustion chamber 28, as described above, in other words, this is because the isolating member 40 has the function of reserving a space required for the insertion of the peripheral wall 12 of the divider wall 10 into the second combustion chamber 28. Furthermore, the isolating member 40 is formed integrally from a resin material, whereby, operation of steps 2 to 4 is particularly easily performed.

MODIFIED EXAMPLES

Figure 7:
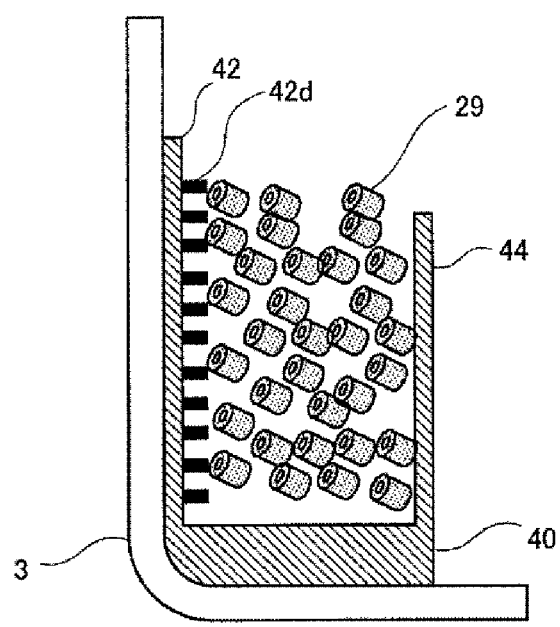
FIG. 7 is a partial enlarged view of a site where the isolating member is in contact with the housing of the gas generator in a modified example.

A modified example of the isolating member 40 that can be applied to the gas generator 1 will be described based on FIG. 7. FIG. 7 is a partial enlarged view of a site where the outer peripheral wall 42 is in contact with the lower shell 3, when the isolating member 40 is disposed in the lower shell 3. The isolating member 40 according to the modified example is different from the isolating member 40 according to the above-described example in that the isolating member 40 according to the modified example includes, on the inner wall surface of the outer peripheral wall 42, a plurality of resin protrusions 42d extending toward the predetermined filling space in which the second gas generating agent 29, etc. is filled, and does not include the lower edge 41 at a lower part of the outer peripheral wall 42. The protrusions 42d are formed from the same resin material as the resin material of the main body of the isolating member 40, and thus, are deformable when receiving force applied by the gas generating agent 29 that is filled, etc. As a result, when the isolating member 40 is filled with the second gas generating agent 29, etc., in a manner in which the plurality of protrusions 42d are moderately deformed, it is possible to suitably create a state in which the above-described holding force is applied to the second gas generating agent 29, etc. In the isolating member 40 illustrated in FIG. 7, the lower edge 41 illustrated in FIG. 5 may be provided to form the gap 50 between the outer peripheral wall 42 and the lower shell 3.

In addition, although the gas generators 1 according to the above-described examples are dual-type gas generators, a single-type gas generator including a single igniter may include an interposing resin isolating member that prevents direct contact between the side and bottom surfaces of the combustion chamber formed in the gas generator and the gas generating agent filled in the combustion chamber. In this case as well, the isolating member is preferably made of a material that is meltable by combustion heat of the gas generating agent.

In the gas generators 1 of the examples described above, the isolating member 40 is formed as a single piece, but the isolating member 40 may be formed by a plurality of pieces.

REFERENCE SIGNS LIST

1 Gas generator
2 Upper shell
3 Lower shell
4 Housing
5 Gas discharge port
10 Divider wall
12 Peripheral wall
13 Dividing wall
14 Mating wall
20 Accommodation space
21 First combustion chamber
22 First gas generating agent
23 First igniter
24 First transfer charge
25 Transfer charge filled chamber
26 Second transfer charge
27 Second igniter
28 Second combustion chamber
29 Second gas generating agent
40 Isolating member
41 Lower edge
42 Outer peripheral wall
42*c* Upper edge
42*d* Protrusion
43 Bottom wall
44 Inner peripheral wall
47 Predetermined space
50 Gap

What is claimed is:

1. A gas generator, comprising:
an igniter;
a housing made of metal and including a gas discharge port and a combustion chamber for burning a solid gas generating agent, the solid gas generating agent being filled at a position where the solid gas generating agent can be burned by actuation of the igniter, and the housing being configured to accommodate the igniter; and
an isolating member including an isolating wall interposed, inside the housing, between the gas generating agent disposed in the combustion chamber and a bottom surface and a side surface of the combustion chamber, the isolating wall being made from a predetermined resin material and being in contact with the gas generating agent to apply a predetermined holding force to the gas generating agent,
wherein the isolating member includes an annular outer peripheral wall, an annular inner peripheral wall, and a bottom wall; and
the gas generating agent is filled in a space defined between the annular outer peripheral wall and the annular inner peripheral wall.

2. The gas generator according to claim 1, wherein the isolating member is formed to cover an entirety of the bottom surface and the side surface of the combustion chamber by the isolating wall.

3. The gas generator according to claim 1, wherein the isolating member is integrally made from the predetermined resin material.

4. The gas generator according to claim 2, wherein the isolating member is integrally made from the predetermined resin material.

5. The gas generator according to claim 1, wherein the side surface of the combustion chamber is partially defined by a predetermined inner wall surface of the housing, and the isolating member is disposed in the housing in a manner in which a gap is formed between the isolating wall and the predetermined inner wall surface of the housing.

6. The gas generator according to claim 2, wherein the side surface of the combustion chamber is partially defined by a predetermined inner wall surface of the housing, and
the isolating member is disposed in the housing in a manner in which a gap is formed between the isolating wall and the predetermined inner wall surface of the housing.

7. The gas generator according to claim 3, wherein the side surface of the combustion chamber is partially defined by a predetermined inner wall surface of the housing, and
the isolating member is disposed in the housing in a manner in which a gap is formed between the isolating wall and the predetermined inner wall surface of the housing.

8. The gas generator according to claim 1, wherein the isolating wall includes a plurality of protrusions made from resin and extending toward an inside of the combustion chamber in a state in which the isolating member is disposed within the housing, and
the plurality of protrusions are deformable when receiving a force applied by the gas generating agent filled in the combustion chamber.

9. The gas generator according to claim 1, wherein in addition to the gas generating agent, a solid transfer charge is filled in the combustion chamber,
the isolating member further includes a transfer charge isolating wall for positioning the transfer charge around the igniter to allow the transfer charge to burn by actuation of the igniter, the transfer charge isolating wall defining a transfer charge filling chamber to prevent the transfer charge and the gas generating agent from being mixed with each other prior to the actuation of the igniter, and
at least the transfer charge isolating wall is made from a material that is deformable, breakable, combustible, or meltable when the transfer charge is burned.

10. The gas generator according to claim 1, wherein
the housing includes a first housing made from metal and including the gas discharge port formed therein and a second housing made from metal and disposed below the first housing,
the housing includes, inside thereof, a divider wall dividing the combustion chamber into a first combustion chamber that is on an upper side and a second combustion chamber that is on a lower side,
a first igniter and a second igniter different from the first igniter are disposed at a bottom surface of the second housing, the first igniter being configured to burn a first gas generating agent filled in the first combustion chamber, and the second igniter being configured to burn a second gas generating agent that is filled in the second combustion chamber and that is the gas generating agent, a first igniter accommodating portion is formed by the divider wall, the first igniter accommodating portion extending into the second housing to surround the first igniter and accommodate the first igniter within the first combustion chamber, a side surface of the second combustion chamber is defined by an inner wall surface of the second housing and a predetermined outer peripheral wall surface of the first igniter accommodating portion positioned in the second housing, and the isolating wall of the isolating member is interposed, in the second housing, between a bottom surface and the side surface of the second combustion chamber and the second gas generating agent filled in the second combustion chamber.

11. A method for assembling a dual-type gas generator including a housing having a first housing made from metal and being provided with a gas discharge port formed therein and a second housing made from metal and disposed below the first housing, the dual-type gas generator further including, in the housing, a first igniter and a second igniter different from the first igniter, the first igniter and the second igniter being configured to burn a first gas generating agent and a second gas generating agent, respectively, the housing including, inside thereof, a divider wall dividing a combustion chamber into a first combustion chamber that is on an upper side and a second combustion chamber that is on a lower side, the first combustion chamber being filled with the first gas generating agent, and the second combustion chamber being filled with the second gas generating agent, a first igniter accommodating portion being formed by the divider wall, the first igniter accommodating portion extending into the second housing to surround and accommodate the first igniter, a side surface of the second combustion chamber being defined by an inner wall surface of the second housing and a predetermined outer peripheral wall surface of the first igniter accommodating portion positioned in the second housing, the method for assembling the dual-type gas generator, comprising:

placing the first igniter and the second igniter at a bottom surface of the second housing;

placing an isolating member into the second housing, the isolating member including an isolating wall made from a predetermined resin material, the isolating wall forming a predetermined filling space that is to be filled with the second gas generating agent and configured to prevent a bottom surface and the side surface of the second combustion chamber and the second gas generating agent from coming into contact with each other, and applies a predetermined holding force to the second gas generating agent filled in the predetermined filling space;

filling the predetermined filling space of the isolating member with the second gas generating agent, and establishing a state in which the predetermined holding force is applied to the filled second gas generating agent;

attaching the divider wall to the second housing to form the second combustion chamber below the divider wall, while inserting a cylindrical peripheral wall of the divider wall, that defines a predetermined space, into a space defined by an annular first igniter surrounding wall of the isolating member, an inner peripheral wall surface of the annular first igniter surrounding wall facing an outer peripheral wall surface of the cylindrical peripheral wall; and placing the first gas generating agent above the divider wall attached to the second housing and at a position where the first gas generating agent can be burned by actuation of the first igniter, and implementing sealing with use of the first housing, thereby forming the first combustion chamber.

\* \* \* \* \*